(12) United States Patent
Lin et al.

(10) Patent No.: US 8,982,413 B2
(45) Date of Patent: Mar. 17, 2015

(54) METHODS, SYSTEMS AND PROCESSOR-READABLE MEDIA FOR DYNAMICALLY DETECTING AND SWITCHING PROFILING CONFIGURATIONS

(71) Applicant: Xerox Corporation, Norwalk, CT (US)

(72) Inventors: Guo-Yau Lin, Fairport, NY (US); James Michael Sanchez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/828,462

(22) Filed: Mar. 14, 2013

(65) Prior Publication Data

US 2014/0268191 A1 Sep. 18, 2014

(51) Int. Cl.
| | |
|---|---|
| *G06K 1/00* | (2006.01) |
| *G06K 15/02* | (2006.01) |
| *G09G 5/02* | (2006.01) |
| *B41J 2/205* | (2006.01) |
| *G06K 9/00* | (2006.01) |

(52) U.S. Cl.
CPC .................................. *G06K 15/1878* (2013.01)
USPC .............. 358/1.9; 358/2.1; 358/3.1; 345/590; 347/15; 382/162

(58) Field of Classification Search
None
See application file for complete search history.

(56) References Cited

U.S. PATENT DOCUMENTS

| | | | | |
|---|---|---|---|---|
| 5,305,119 | A | 4/1994 | Rolleston et al. | 358/522 |
| 5,528,386 | A | 6/1996 | Rolleston et al. | 358/522 |
| 5,739,927 | A | 4/1998 | Balasubramanian et al. | 358/518 |
| 5,903,712 | A | 5/1999 | Wang et al. | 395/109 |
| 6,351,308 | B1 | 2/2002 | Mestha | 356/402 |
| 6,480,299 | B1 * | 11/2002 | Drakopoulos et al. | 358/1.9 |
| 6,937,249 | B2 | 8/2005 | Herbert et al. | 345/581 |
| 6,996,358 | B2 * | 2/2006 | Ayaki et al. | 430/45.4 |
| 7,239,422 | B2 | 7/2007 | Braun et al. | 358/1.9 |
| 7,742,058 | B2 | 6/2010 | Mahy et al. | 358/590 |
| 8,005,387 | B2 * | 8/2011 | Nishiwaki et al. | 399/66 |
| 8,134,741 | B2 * | 3/2012 | Mo et al. | 358/1.9 |
| 8,305,665 | B2 * | 11/2012 | Sakamoto et al. | 358/518 |
| 8,358,944 | B2 * | 1/2013 | Yamade | 399/39 |
| 8,508,798 | B2 * | 8/2013 | Hirano et al. | 358/1.9 |
| 2007/0273900 | A1 | 11/2007 | Bai | 358/1.9 |
| 2010/0157339 | A1 * | 6/2010 | Yamada | 358/1.9 |
| 2010/0165367 | A1 | 7/2010 | Nomura | 358/1.9 |
| 2011/0286014 | A1 * | 11/2011 | Wu et al. | 358/1.9 |
| 2012/0008170 | A1 | 1/2012 | Yan | 358/3.06 |
| 2012/0212752 | A1 | 8/2012 | Wang et al. | 358/1.9 |

\* cited by examiner

*Primary Examiner* — Steven Kau (74) *Attorney, Agent, or Firm* — Kermit D. Lopez; Luis M. Ortiz; Ortiz & Lopez, PLLC (57) ABSTRACT

Methods and systems for dynamically detecting and switching profiling configuration in digital rendering. A set of color patches utilized for profiling can be rendered via a calibration engine and the color patches can be measured via inline/offline spectrophotometer. A high-accuracy MFD model can be built based on measurement from the color patches. A set of measurement values for a set of CMYK color probes can be obtained directly from the measurement and/or by processing through a MFD model. A classifier can be configured to determine a toner set based on the predicted and/or measured Lab values. The profiling procedure then automatically sets up a parameter set for the corresponding toner set to build a color look-up table via an inversion and optimization function. A destination ICC profile can be built based on the color LUTs. The system can handle multiple toner sets and produce optimized color outcome for each toner set.

18 Claims, 5 Drawing Sheets

METHODS, SYSTEMS AND PROCESSOR-READABLE MEDIA FOR DYNAMICALLY DETECTING AND SWITCHING PROFILING CONFIGURATIONS

TECHNICAL FIELD

Embodiments are generally related to rendering devices, including multi-function devices such as, printers, scanners, photocopy machines, and the like. Embodiments are additionally related to color management systems. Embodiments are additionally related to the detection and switching of profiling configurations in digital rendering applications.

BACKGROUND OF THE INVENTION

An MFD (Multi-Function Device) is a rendering device or office machine, which incorporates the functionality of multiple devices in one apparatus or system, so as to have a smaller footprint in a home or small business setting, or to provide centralized document management/distribution/production in the context of, for example, a large-office setting. A typical MFD may provide a combination of some or all of the following capabilities: printer, scanner, photocopier, fax machine, e-mail capability, and so forth. Networked MFDs (Multi-Function Devices) generally interact with an assemblage of varying rendering devices, client computers, servers, and other components that are connected to and communicate over a network.

In color management, an ICC profile is a set of data that characterizes a color input or output device, or a color space, according to standards promulgated by the International Color Consortium (ICC). Profiles describe the color attributes of a particular device or viewing requirement by defining a mapping between the device source or target color space and a profile connection space (PCS). Each digital color press has a color package associated with the product. The color package profiling functionalities can be optimized for a print engine based on configuration, e.g. toner set, etc. In general, the color functionalities can also be re-optimized based on a different set of parameters if the toner set changes.

Conventionally, the color package, which is a set of data, ICC profiles, profiling functionalities, and the associated parameters, etc., can be selected by a user on the DFE (Digital Front End) during installation time. If the color package for the wrong toner set is picked by the user, the color produced from the wrong color package will not be optimized. Such manual methods are time consuming, error prone and the recover procedure involves uninstalling and re-installing the correct color package. Furthermore, storing of multiple color packages for different toner sets is wasteful and are also hard to manage in terms of software versioning management and customer support.

Based on the foregoing, it is believed that a need exists for improved methods and/or systems for dynamically detecting and switching profiling configurations in digital rendering applications, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods, systems and processor-readable media for managing a multi-function device (MFD), such as a printer, scanner, photocopy machine, fax machine, etc., or a combination thereof.

It is another aspect of the disclosed embodiments to provide for an improved color management methods, systems and processor-readable media.

It is a further aspect of the disclosed embodiments to provide for methods, systems and processor-readable media for dynamically detecting and switching profiling configuration in digital rendering.

The aforementioned aspects and other objectives and advantages can now be achieved as described herein. Methods, systems and processor readable media are disclosed for dynamically detecting and switching profiling configuration in digital rendering. A set of color patches utilized for profiling can be rendered via a calibration engine and the color patches can be measured via an inline/offline spectrophotometer. A high-accuracy MFD model can be built based on measurement from the color patches. A set of measurement values (e.g., a set of Lab values in some cases) for a set of CMYK color probes can be obtained directly from the measurement and/or by processing through the MFD model. A classifier can be configured to determine a toner set based on the predicted and/or measured Lab values. The profiling procedure then automatically sets up a parameter set for the corresponding toner set to build a color look-up table via an inversion and optimization function. A destination ICC profile can be built based on the color LUTs. The system can handle multiple toner sets and produce optimized color outcome for each toner set.

The classifier can be trained offline by comparing a MFD gamut between two (or multiple) different toner sets. An area that yields a large difference between two gamut can be located and a probing CMYK set can be determined. A toner property can be obtained through the measurement of the CMYK probing set for both toner sets. The classifier functions by obtaining the Lab values for each probing color. A similarity between the toner can be computed for each probing color to determine the toner set associated with the MFD. The classifier based on the MFD color data, dynamically determines the optimized parameter set that can be employed during profiling. The information for multiple toner sets can be built into a single color package and utilized during profiling. Such an approach dynamically detects the installed toner set associated with the host MFD, and adopts the optimal profiling configuration for the toner set.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
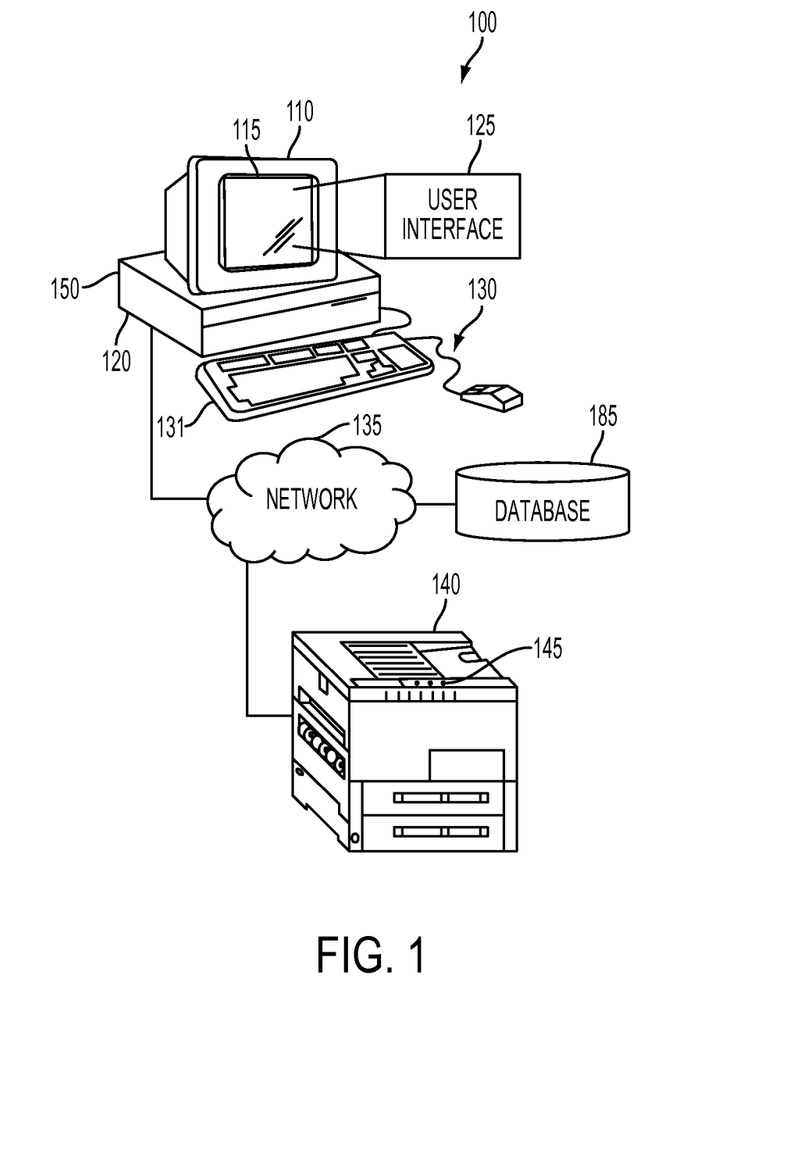
FIG. 1 illustrates an example of a multi-function device coupled to a data-processing apparatus through a network, in accordance with the disclosed embodiments.

Referring to FIG. 1, system 100 is illustrated and can be configured to include one or more networked devices, such as networked device 140, coupled to a data-processing apparatus 110 through a network 135. In some embodiments, networked device 140 may be a rendering device such as a printer, scanner, copy machine, etc. In other embodiments, networked device 140 may be an MFD, a file server and/or a print server. The data-processing apparatus 110 may be, for example, a personal computer or other computing device, and generally includes a central processor 120, a display device 115, a keyboard 131, and a pointing device 130 (e.g., mouse, track ball, pen device, or the like).

Note that as utilized herein, the term networked device may refer to an apparatus or system such as a printer, scanner, fax machine, copy machine, etc., and/or a combination thereof (e.g., an MFD). Preferably, networked device 140 is an MFD 140 capable of multiple rendering functions such as printing, copying, scanning, faxing, etc. In some embodiments, the MFD 140 may be implemented with a single rendering function such as printing. In other embodiments, the MFD 140 can be configured to provide multiple rendering functions, such as scanning, faxing, printing and copying.

The data-processing apparatus 110 can be coupled to the MFD 140 (and other rendering devices) through a computer network 135. Network 135 may employ any network topology, transmission medium, or network protocol. The network 135 may include connections, such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The networked MFD 140 includes a user interface 145, such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a rendering job with the driver for processing by the MFD 140.

The data-processing apparatus 110 also includes a GUI 125 for communicating rendering features for processing, for example, the rendering job to a user 380 and accepting the user's 380 selection of available rendering features. The user interface 125 displays information and receives data through device display and/or the keyboard/mouse combination. The interface 125, also serves to display results, whereupon the user 380 may supply additional inputs or terminate a given session. The data-processing apparatus 110 can be, for example, any computing device capable of being integrated within a network 135, such as a PDA, personal computer, cellular telephone, point-of-sale terminal, server 230, etc.

The input device of the networked device 140, for example, may be a local user interface 125, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface 125 by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the disclosed embodiments, which can be embodied in the context of the data-processing apparatus 110 and the networked device 140 depicted in FIG. 1. The disclosed embodiments, however, is not limited to any particular application or any particular environment. Instead, those skilled in the art will find that the system and methods of the disclosed embodiments may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 2:
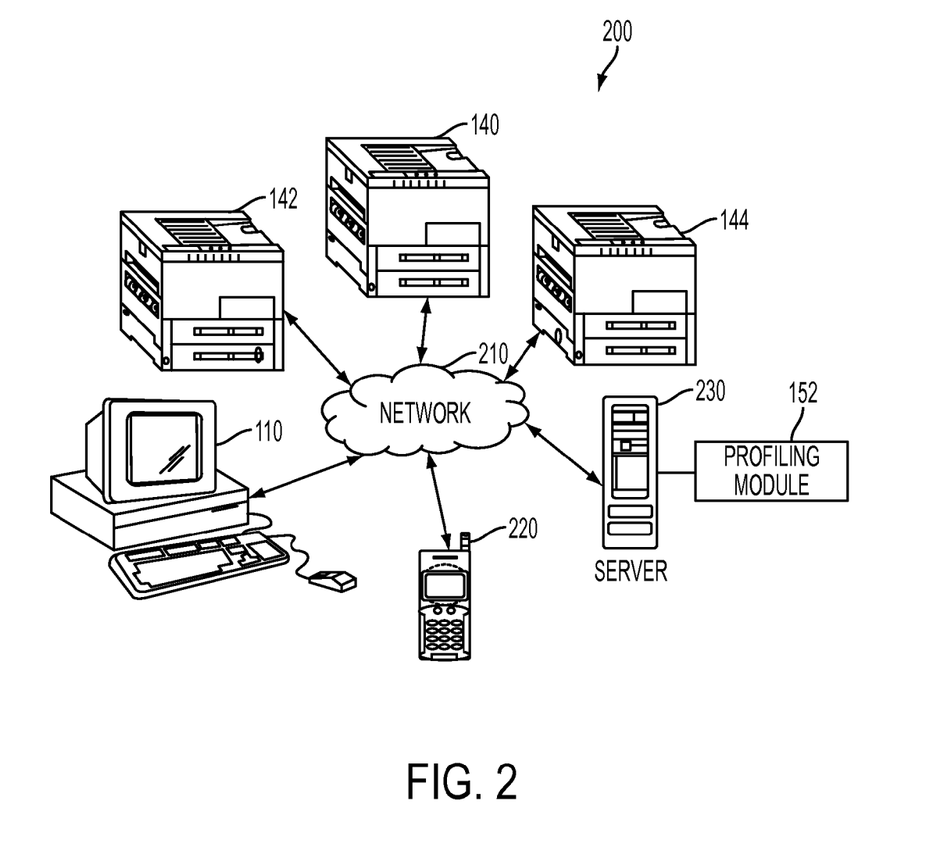
FIG. 2 illustrates a graphical representation of an image processing system having a profiling module associated with a network, in accordance with the disclosed embodiments.

FIG. 2 illustrates a graphical representation of an image processing system 200 having a profiling module 152 associated with a network 210, in accordance with the disclosed embodiments. The image processing system 200 generally includes a network infrastructure 210 associated with one or more networked MFDs 140, 142 and 144, data-processing system 110, a mobile communication device 220 and a server 230. Data-processing apparatus 110 depicted in FIG. 1 can be, for example, a server 230. Other devices such as, for example, desktops, network devices, palmtops, mobile phones, etc may also be included in the network 210, as service providers. The MFDs 140, 142 and 144 can be located remotely with respect to each other, or alternatively, they may be located locally with respect to each other.

The typical MFD 140 may act as a combination of a printer, scanner, photocopier, fax and e-mail. While three MFDs 140, 142 and 144 are shown by way of example, it is to be appreciated that any number of MFDs may be linked to the network 210, such as, four, six or more rendering devices. In general, the MFDs 140, 142 and 144 can be employed to perform a rendering output function (e.g., printing, scanning, copying, faxing, etc.) within a networked environment. Note that MFDs 140, 142 and 144 are generally analogous to one another. The profiling module 152 dynamically detects and switches profiling configuration in digital rendering.

Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

Figure 3:
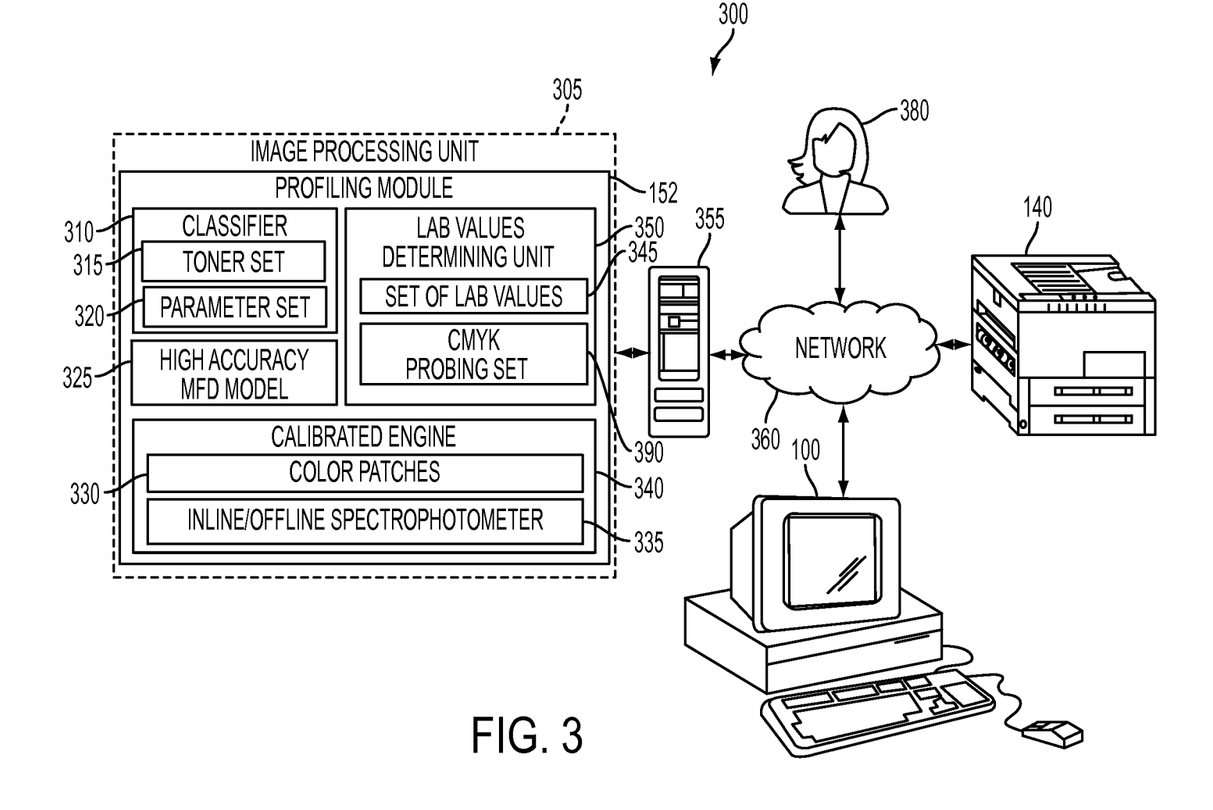
FIG. 3 illustrates a block diagram of a multi-function device profiling system, in accordance with the disclosed embodiments.

FIG. 3 illustrates a block diagram of a multi-function device profiling system 300, in accordance with the disclosed embodiments. The multi-function device profiling system 300 includes an image processing unit 305 connected to the MFD 140 via a network 360. The image processing unit 305 includes the profiling module 152 for dynamically detecting and switching profiling configuration in digital rendering. The system 300 combines multiple color packages that are intended for installing different toner sets on similar MFD hardware into a single color package. The image processing unit 305 is preferably a small, handheld computer device or palmtop computer as depicted in FIG. 1 that provides portability and is adapted for easy mounting.

Note that the network 360 may employ any network topology, transmission medium, or network protocol. The network 360 may include connections, such as wire, wireless communication links, or fiber optic cables. Network 360 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The profiling module 152 can be configured to include a classifier 310, a high accuracy MFD model 325, a lab values determining unit 350 and a calibrated engine 340. The calibrated engine 340 render a set of color patches 330 and measure the patches 330 through an inline or an offline spectrophotometer 335. The spectrophotometer is an analytical instrument that measures the intensity of light as a function of its wavelength. The high accuracy MFD model 325 can be built based on the measurement of color patches 330.

The lab values determining unit 350 obtains a set of Lab values 345 (i.e., just one example of measurement values) for a CMYK probing set 390 either directly from the measurement, or by processing the CMYK probing set 390 through the MFD model 325. A Lab color space is a color-opponent space with dimension L for lightness and a and b for the color-opponent dimensions, based on nonlinearly compressed CIE XYZ color space coordinates. The CMYK color model (process color, four color) is a subtractive color model, used in color printing, and is also used to describe the printing process itself. CMYK refers to the four inks used in some color printing: cyan, magenta, yellow, and key (black).

The classifier 310 determines which toner set 315 is being employed based on the measured or predicted Lab values 345. The classifier 310 builds color LUTs through the inversion or optimization functions utilizing the MFD model 325 and the parameter set 320 for the appropriate toner set 315. The classifier 310 builds a destination ICC profile based on the color LUTs. The classifier 310 can be trained offline based on the known MFD, and/or the MFDs that the color package is designed to handle. The final color package includes the information that the classifier 310 requires to know in order to determine the toner set 315.

Figure 4:
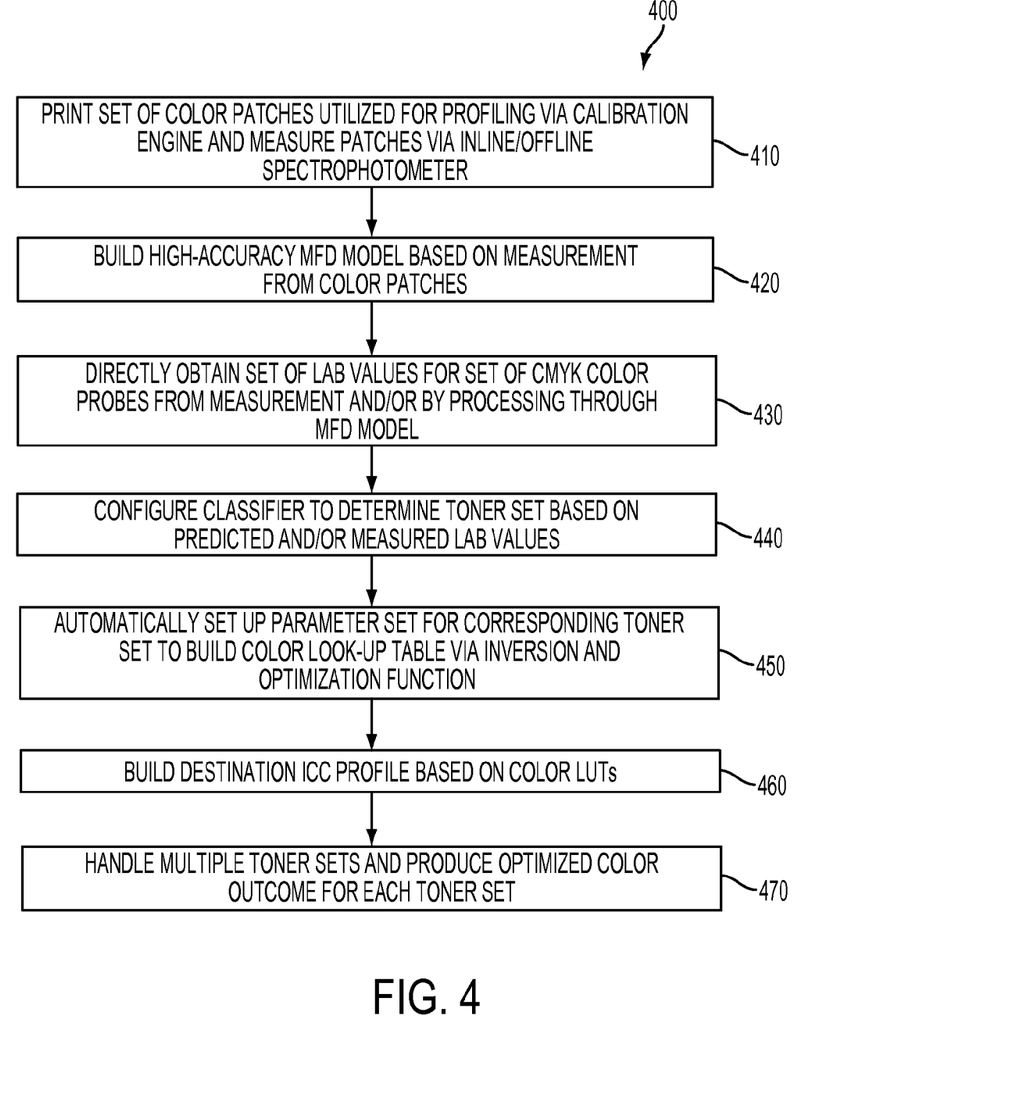
FIG. 4 illustrates a high level flow chart of operations illustrating logical operational steps of a method for dynamically detecting and switching profiling configuration in digital rendering, in accordance with the disclosed embodiments.

FIG. 4 illustrates a high level flow chart of operations illustrating logical operational steps of a method 400 for dynamically detecting and switching profiling configuration in digital rendering, in accordance with the disclosed embodiments. Initially, as indicated at block 410, the set of color patches 330 utilized for profiling can be rendered via the calibration engine 340 and the patches 330 can be measured via the inline or offline spectrophotometer 335. The high-accuracy MFD model 325 can be built based on measurement from the color patches 330, as shown at block 420. The set of Lab values 345 for the set of CMYK color probes can be obtained directly from the measurement and/or by processing through the MFD model 325, as indicated at block 430.

The classifier 310 can be configured to determine the toner set 315 based on the predicted and/or measured Lab values 345, as illustrated at block 440. Thereafter, as shown at block 450, the profiling procedure then automatically sets up the parameter set 320 for the corresponding toner set 315 to build color look-up table via inversion or optimization functions. The destination ICC profile can be built based on the color LUTs, as depicted at block 460. The unified color package can handle multiple toner sets 315 and produce optimized color outcome for each toner set 315, as illustrated at block 470.

Figure 5:
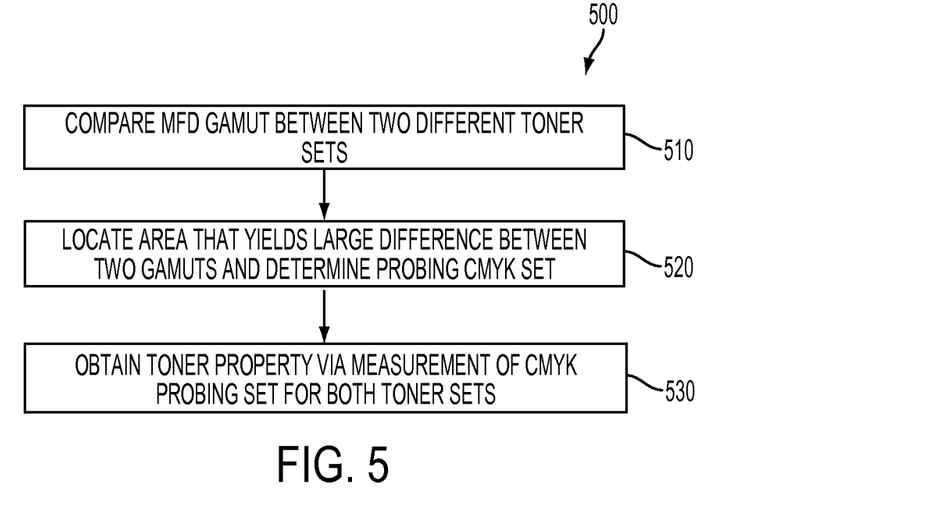
FIG. 5 illustrates a high level flow chart of operations illustrating logical operational steps of a method for training a classifier, in accordance with the disclosed embodiments.

FIG. 5 illustrates a high level flow chart of operations illustrating logical operational steps of a method 500 for training the classifier 310, in accordance with the disclosed embodiments. Initially, as shown at block 510, the MFD gamut between two different toner sets can be compared. The area that yields the large difference between two gamut (usually the peak of C, M, Y, K, CM, CY, or MY) can be located and the probing CMYK set can be determined, as illustrated at block 520.

The toner property through the measurement of the CMYK probing set 390 for both toner sets 315 can be obtained, as indicated at block 530. For example, the toner property from toner set 1 is $Lab^1_M$, $Lab^1_{CM}$ and the toner property from toner set 2 is $Lab^2_M$, $Lab^2_{CM}$. The CMYK probing set 390 can also be obtained by computing $\Delta E$ between measurement data from two toner sets and sorting the computed $\Delta E$ in descending order. Initially, 10% (or a sufficient portion) colors in the sorted $\Delta E$ list are picked as the probing set 390. A subset of the entire measurement data can be employed to compute $\Delta E$ to avoid picking similar probing colors (e.g., CMYK=255,0,0,0 and 248,0,0,0). The subset can also be employed to pick the probing set 390 to include colors with different primaries.

Figure 6:
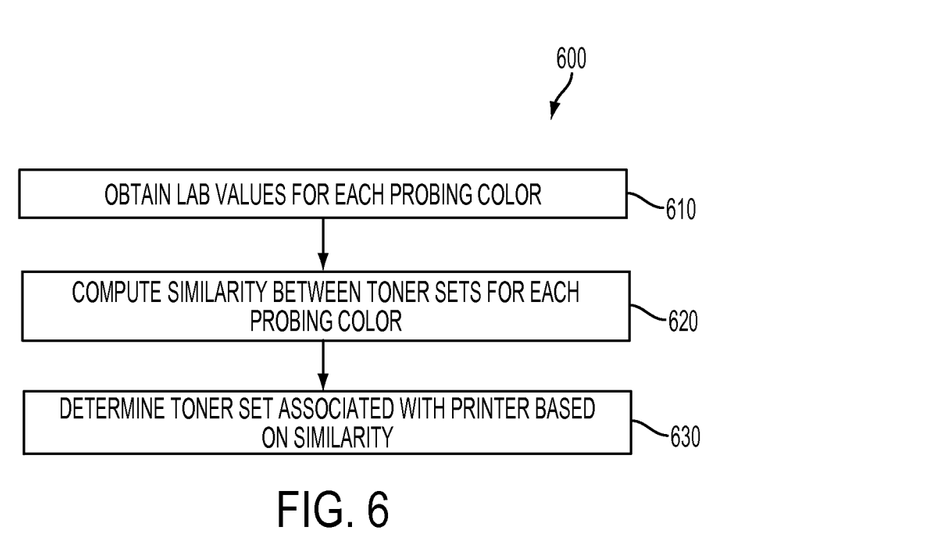
FIG. 6 illustrates a high level flow chart of operations illustrating logical operational steps of a method for determining a toner set for the multi-function device, in accordance with the disclosed embodiments.

FIG. 6 illustrates a high level flow chart of operations illustrating logical operational steps of a method 600 for determining the toner set 315 for the multi-function device, in accordance with the disclosed embodiments. The classifier 310 obtains Lab values 345 for each probing color k, i.e. $Lab^{test}_k$, as shown at block 610. For each probing color, the similarity between toner sets i and j, i.e., $Lab^i_k$, and $Lab^j_k$ can be computed, as indicated at block 620. For example, if $\|Lab^{test}_k - Lab^i_k\| < \|Lab^{test}_k - Lab^j_k\|$, probe k is closer to toner set i; else, probe k is closer to toner set j.

The toner set 315 associated with the MFD 140 can be computed based on the similarity, as illustrated at block 630. For example, if all probing colors are closer to toner set i, determine the toner set i is on the MFD. If all probing colors are closer to toner set j, determine the toner set j is on the MFD, else the fallback strategy can be employed as follows. The toner set to be the default (or the commonly installed) toner set can be employed. Otherwise, the probing color that produces largest $\Delta E$ between $Lab^i_k$ and $Lab^j_k$ can be employed as the key and the toner set 315 can be determined. Else, a return error code can be presented and the profiling can be exited.

The classifier 310, based on MFD color data, can dynamically determine the optimized parameter set 320 to use during profiling. The information for multiple toner sets 315 (also print engines that use different xerography, hardware configurations, etc) can be built into a single color package, and utilized live during profiling. The footprint for the additional parameter set 320 and the classifier 310 is small compared with the rest of the color content. Therefore, for almost the same size, a unified color package can handle multiple toner sets 315, but still produce optimized color outcome for each toner set 315. The single package is easier to install and manage from engineering or customer stand point. When switching toner set 315, there is no need to re-install color package, or re-configure the DFE/profiling tool. The final color package includes the information that the classifier 310 needs to know in order to determine the toner set 315.

Based on the foregoing, it can be appreciated that a number of embodiments, preferred and alternative, are disclosed for dynamically detecting and switching profiling configurations. For example, in one embodiment, a method is disclosed for dynamically detecting and switching profiling configurations. Such a method can include the steps or logical operations of rendering color patches utilized for profiling via a calibration engine; generating a multi-function device model based on a measurement from the color patches to thereafter directly obtain a set of measurement values with respect to one or more CMYK color probes derived from the measurement; and configuring a classifier to determine a toner set based on the set of measurement values to thereafter automatically set up a parameter set to construct a color look-up table via an inversion and optimization function.

In another embodiment, a step or logical operation can be provided for measuring the color patches via for example, devices such as a spectrophotometer, a colorimeter, a densitometer, a scanner, a high-speed camera, and/or a spectroradiometer. In still another embodiment, a step or logical operation can be implemented for directly obtaining the set of measurement values for the CMYK color probes by processing particular data through the multi-function device model. In still another embodiment, steps or logical operations can be implemented for constructing a destination ICC profile based on the color look-up table; and configuring the classifier to handle one or more toner sets and generate an optimized color outcome with respect to each toner set among the toner sets.

In another embodiment, steps or logical operations can be implemented for training the classifier offline by comparing a multi-function device gamut between at least two different toner sets; locating an area that yields a large difference between at least two gamuts; determining the CMYK color probes; and obtaining a toner property via the measurement of the CMYK color probes for the at least two different toner sets. In still another embodiment, a step or logical operation can be provided for obtaining the set of measurement values with respect to each probing color among the CMYK color probes; computing a similarity between toner sets for each probing color among the plurality of CMYK color probes; and determining the toner set associated with the multi-function device based on the similarity.

In other embodiments, steps or logical operations can be provided for dynamically determining an optimized parameter set capable of being employed during the profiling via the classifier. In still other embodiments, steps or logical operations can be implemented for configuring information from one or more toner sets into a single color package for the profiling.

In another embodiment, a system for dynamically detecting and switching profiling configurations can be implemented. Such a system can include, for example, a processor, and a computer-usable medium embodying computer program code, wherein the computer-usable medium is capable of communicating with the processor. The computer program code can include instructions executable by the processor and configured for example, for rendering one or more color patches utilized for profiling via a calibration engine, generating a multi-function device model based on a measurement from the color patches to thereafter directly obtain a set of measurement values with respect to one or more CMYK color probes derived from the measurement, and configuring a classifier to determine a toner set based on the set of measurement values to thereafter automatically set up a parameter set to construct a color look-up table via an inversion and optimization function.

In another embodiment, such instructions can be further configured for measuring the color patches via, for example, devices such as a spectrophotometer, a colorimeter, a densitometer, a scanner, a high-speed camera, and/or a spectroradiometer. In yet another embodiment, such instructions can be further configured for directly obtaining the set of measurement values for the CMYK color probes by processing particular data through the multi-function device model. In still another embodiment, such instructions can be further configured for constructing a destination ICC profile based on the color look-up table, and configuring the classifier to handle one or more toner sets and generate an optimized color outcome with respect to each toner set among the toner sets.

In another embodiment, such instructions can be further configured for training the classifier offline by comparing a multi-function device gamut between at least two different toner sets, locating an area that yields a large difference between at least two gamuts, determining the CMYK color probes, and obtaining a toner property via the measurement of the CMYK color probes for the at least two different toner sets.

In still another embodiment, such instructions can be further configured for obtaining the set of measurement values with respect to each probing color among the CMYK color probes, computing a similarity between toner sets for each probing color among the plurality of CMYK color probes, and determining the toner set associated with the multi-function device based on the similarity.

In yet another embodiment, such instructions can be further configured for dynamically determining an optimized parameter set capable of being employed during the profiling via the classifier. In still another embodiment, such instructions can be further configured for providing information from one or more toner sets into a single color package for the profiling.

In another embodiment, a processor-readable medium storing computer code representing instructions to cause a process for dynamically detecting and switching profiling configurations can be implemented. Such computer code can include code to, for example, render one or more color patches utilized for profiling via a calibration engine, generate a multi-function device model based on a measurement from the color patches to thereafter directly obtain a set of measurement values with respect to one or more CMYK color probes derived from the measurement, and configure a classifier to determine a toner set based on the set of measurement values to thereafter automatically set up a parameter set to construct a color look-up table via an inversion and optimization function. Note that in some embodiments, such code can include code to measure the color patches via, for example, devices such as a spectrophotometer, a colorimeter, a densitometer, a scanner, a high-speed camera, and/or a spectroradiometer.

In other embodiments, such code can include code to directly obtain the set of measurement values for the CMYK color probes by processing particular data through the multi-function device model. In yet other embodiments, such code can include code to construct a destination ICC profile based on the color look-up table, and configure the classifier to handle a one or more sets and generate an optimized color outcome with respect to each toner set among the toner sets.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for dynamically detecting and switching profiling configurations, said method comprising:
    rendering a plurality of color patches via a multi-function device;
    measuring said plurality of color patches to obtain measurement values;
    generating a multi-function device model based on said measurement values;
    obtaining Lab values for said plurality of color patches from said measurement values;
    configuring a classifier to determine a toner set being utilized by said multi-function device based on said Lab values, generate a parameter set for said toner set, and build color look-up tables;
    building a destination International Color Consortium profile based on said color look-up tables;
    training said classifier offline by comparing a multi-function device gamut between at least two different toner sets;
    locating an area that yields a large difference between at least two gamuts;
    determining a plurality of CMYK color probes; and
    obtaining a toner property via said measurement of said plurality of CMYK color probes for said at least two different toner sets.

2. The method of claim 1 further comprising measuring said plurality of color patches via at least one of the following devices: a spectrophotometer, a colorimeter, a densitometer, a scanner, a high-speed camera, or a spectroradiometer.

3. The method of claim 1 further comprising directly obtaining said measurement values for said plurality of color patches by processing particular data through said multi-function device model.

4. The method of claim 1 further comprising:
    configuring said classifier to handle a plurality of toner sets and generate an optimized color outcome with respect to each toner set among said plurality of toner sets.

5. The method of claim 1 further comprising:
    obtaining said set of measurement values with respect to each of said plurality of color patches;
    computing a similarity between toner sets for each of said plurality of color patches; and
    determining said toner set associated with said multi-function device based on said similarity.

6. The method of claim 1 further comprising dynamically determining an optimized parameter set capable of being employed during said profiling via said classifier.

7. The method of claim 6 further comprising configuring information from a plurality of toner sets into a single color package for said profiling.

8. A system for dynamically detecting and switching profiling configurations, said system comprising:
a processor; and
a computer-usable medium embodying computer program code, said computer-usable medium capable of communicating with said processor, said computer program code comprising instructions executable by said processor and configured for:
rendering a plurality of color patches via a multi-function device;
measuring said plurality of color patches to obtain measurement values;
generating a multi-function device model based on said measurement values;
obtaining Lab values for said plurality of color patches from said measurement values;
configuring a classifier to determine a toner set being utilized by said multi-function device based on said Lab values, generate a parameter set for said toner set, and build color look-up tables;
build a destination International Color Consortium profile based on said color look-up tables;
training said classifier offline by comparing a multi-function device gamut between at least two different toner sets;
locating an area that yields a large difference between at least two gamuts;
determining a plurality of CMYK color probes; and
obtaining a toner via said measurement of said plurality of CMYK color probes for said at least two different toner sets.

9. The system of claim 8 wherein said instructions are further configured for measuring said plurality of color patches at least one of the following devices: a spectrophotometer, a colorimeter, a densitometer, a scanner, a high-speed camera, or a spectroradiometer.

10. The system of claim 8 wherein said instructions are further configured for directly obtaining said set of measurement values for said plurality of color patches by processing particular data through said multi-function device model.

11. The system of claim 8 wherein said instructions are further configured for:
configuring said classifier to handle a plurality of toner sets and generate an optimized color outcome with respect to each toner set among said plurality of toner sets.

12. The system of claim 8 wherein said instructions are further configured for:
obtaining said set of measurement values with respect to each probing color among said plurality of CMYK color probes;
computing a similarity between toner sets for each probing color among said plurality of CMYK color probes; and
determining said toner set associated with said multi-function device based on said similarity.

13. The system of claim 8 wherein said instructions are further configured for dynamically determining an optimized parameter set capable of being employed during said profiling via said classifier.

14. The system of claim 13 wherein said instructions are further configured for providing information from a plurality of toner sets into a single color package for said profiling.

15. A non-transitory processor-readable medium storing computer code representing instructions to cause a process for dynamically detecting and switching profiling configurations, said computer code comprising code to:
render a plurality of color patches via a multi-function device;
measure said plurality of color patches to obtain measurement values;
generate a multi-function device model based on said measurement values;
obtain Lab values for said plurality of color patches from said measurement values;
configure a classifier to determine a toner set being utilized by said multi-function device based on said Lab values, generate a parameter set for said toner set, and build color look-up tables;
build a destination International Color Consortium profile based on said color look-up tables;
train said classifier offline by comparing a multi-function device gamut between at least two different toner sets;
locate an area that yields a large difference between at least two gamuts;
determine a plurality of CMYK color probes; and
obtain a toner property via said measurement of said plurality of CMYK color probes for said at least two different toner sets.

16. The non-transitory processor-readable medium of claim 15 wherein said code further comprises code to measure said plurality of color patches via at least one of the following devices: a spectrophotometer, a colorimeter, a densitometer, a scanner, a high-speed camera, or a spectroradiometer.

17. The non-transitory processor-readable medium of claim 15 wherein said code further comprises code to directly obtain said set of measurement values for said plurality of CMYK color probes by processing particular data through said multi-function device model.

18. The non-transitory processor-readable medium of claim 15 wherein said code further comprise code to:
configure said classifier to handle a plurality of toner sets and generate an optimized color outcome with respect to each toner set among said plurality of toner sets.

* * * * *